United States Patent [19]

Suzuki

[11] Patent Number: 5,022,285
[45] Date of Patent: Jun. 11, 1991

[54] TRANSIENT REDUCTION RATIO CONTROL DURING SHIFT BETWEEN TWO MODE OPERATIONS

[75] Inventor: Yutaka Suzuki, Atsugi, Japan

[73] Assignee: Nissan Motor Co., Ltd., Yokohama, Japan

[21] Appl. No.: 437,227

[22] Filed: Nov. 16, 1989

[30] Foreign Application Priority Data

Nov. 16, 1988 [JP] Japan .................. 63-287843

[51] Int. Cl.⁵ .................................. B60K 41/12
[52] U.S. Cl. .................................. 74/866; 74/867; 364/424.1; 474/18
[58] Field of Search .............. 74/866, 867, 865; 364/424.1; 474/18

[56] References Cited

U.S. PATENT DOCUMENTS

| 4,509,125 | 4/1985 | Fattic et al. | 364/424.1 |
| 4,735,113 | 4/1988 | Yamamuro et al. | 74/866 |
| 4,764,155 | 8/1988 | Kumura et al. | 474/12 |
| 4,793,217 | 12/1988 | Morisawa et al. | 74/866 |
| 4,796,489 | 1/1989 | Nagamatsu et al. | 74/868 |
| 4,846,019 | 7/1989 | Kumura | 74/864 |
| 4,875,892 | 10/1989 | Sueda | 474/18 |

FOREIGN PATENT DOCUMENTS 61-105353 5/1986 Japan .
62-113956 5/1987 Japan .

Primary Examiner—Dwight Diehl
Attorney, Agent, or Firm—Foley & Lardner

[57] ABSTRACT

According to a control for a continuously variable transmission for a motor vehicle, in order to avoid a rapid increase in engine revolution speed upon selecting a power mode from an ordinary mode, the reduction ratio of the continuously variable transmission is varied along a third schedule which connects an ordinary shift schedule for the ordinary mode with a power shift schedule for the power mode. The third schedule is expressed as a funtion of time that has pressed since the instant when the power mode has been selected.

10 Claims, 4 Drawing Sheets

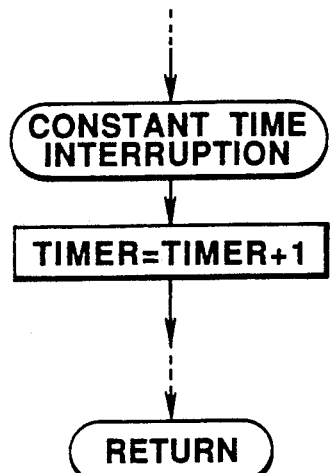
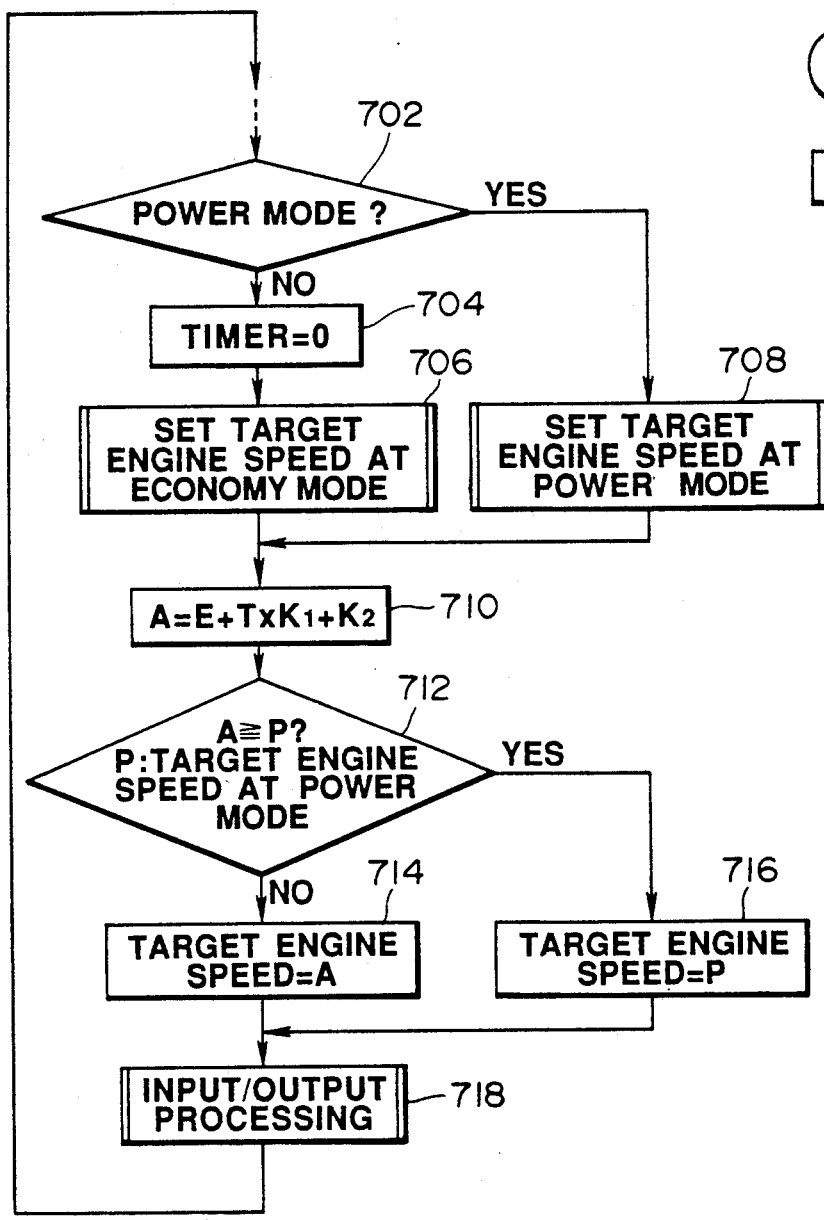

TRANSIENT REDUCTION RATIO CONTROL DURING SHIFT BETWEEN TWO MODE OPERATIONS

RELATED PATENT

U.S. Pat. No. 4,735,113 (=EP No. 0180209) issued to Yamamuro et al. on Apr. 5, 1988 discloses a control for a continuously variable transmission for a motor vehicle including an engine. The disclosure of this patent is hereby incorporated by reference in its entirety.

BACKGROUND OF THE INVENTION

The present invention relates to a continuously variable transmission for a motor vehicle including an engine which the transmission is drivingly connected to, and more particularly to a control apparatus and a control method for such continuously variable transmission.

The conventional continuously variable transmission is shiftable in reduction ratio in accordance with one of a plurality of patterns or schedules. Upon making a change from one to another schedule among the plurality of schedules, a target value of a predetermined control variable such as a target engine revolution speed is subject to a step-like change. This causes the transmission to shift quickly in such a direction as to bring an actual value of the predetermined control variable into agreement with the target value. Thus, the engine revolution speed is subject to a rapid change.

When a change is made from one schedule to another in order to produce more power for acceleration, the continuously variable transmission shifts down rapidly to force the engine to increase its speed rapidly. The inertia torque induced by this rapid engine speed increase absorbs torque produced by the engine, resulting in a temporary reduction in driving power for accelerating the vehicle, thus degrading ride feel for acceleration.

An object of the present invention is to control a continuously variable transmission such that the above-mentioned power interruption is eliminated to give an improved ride feel for acceleration.

SUMMARY OF THE INVENTION

According to the present invention, the above-mentioned rapid increase in engine speed is prevented by varying a reduction ratio of a continuously variable transmission as a function of time elapsed from the instant when a change is made from one to another schedule to meet demand for power until a predetermined condition is satisfied, and controlling the reduction ratio in accordance with the new schedule after the predetermined condition is satisfied. With this control, the increase in engine speed during transition between two schedules becomes under control, thus avoiding interruption of driving power.

According to one aspect of the present invention, there is provided a control apparatus for a continuously variable transmission for a motor vehicle including an engine, the continuously variable transmission being shiftable in reduction ratio in accordance with one of a plurality of predetermined schedules including a first predetermined schedule and a second predetermined schedule, the control apparatus comprising: means for controlling a reduction ratio of the continuously variable transmission in accordance with the first predetermined schedule when use of the first predetermined schedule is demanded; said controlling means being operative to control the reduction ratio in accordance with a predetermined function of time that has passed since the instant when a change is made from demand for use of the first predetermined schedule to demand for use of the second predetermined schedule until a predetermined condition is satisfied; said controlling means being operative to control the reduction ratio in accordance with the second predetermined schedule after said predetermined condition is satisfied when use of the second predetermined schedule is demanded.

According to a specific aspect of the present invention, there is provided a control apparatus for a continuously variable transmission for a motor vehicle including an engine, the continuously variable transmission being shiftable in reduction ratio in accordance with one of a plurality of predetermined schedules including a first predetermined schedule and a second predetermined schedule, the control apparatus comprising; means for generating a state indicative signal which assumes a first level when use of the first predetermined schedule is demanded and a second level when use of the second predetermined schedule is demanded, means for generating a time indicative signal indicative of time that has passed since the instant when said state indicative signal has been subject to a change from said first level thereof to said second level thereof; and means for controlling a reduction ratio of the continuously variable transmission in accordance with the first predetermined schedule when said state indicative signal assumes said first level thereof; said controlling means being operative to determine a ramp or third schedule connecting the first predetermined schedule to the second predetermined schedule as a predetermined function of said time indicative signal and vary the reduction ratio in accordance with said ramp until a predetermined condition is satisfied after said change has been made, said controlling means being operative to control the reduction ratio in accordance with the second predetermined schedule after said predetermined condition is satisfied when said state indicative signal assumes said second level thereof.

According to another aspect of the present invention, there is provided a control method for a continuously variable transmission for a motor vehicle including an engine, the continuously variable transmission being shiftable in reduction ratio in accordance with one of a plurality of predetermined schedules including a first predetermined schedule and a second predetermined schedule, the control method comprising the steps of; controlling a reduction ratio of the continuously variable transmission in accordance with the first predetermined schedule when use of the first predetermined schedule is demanded, controlling the reduction ratio in accordance with a predetermined function of time that has passed since the instant when a change has been made from demand for use of the first schedule to demand for use of the second predetermined schedule until a predetermined condition is satisfied, and controlling the reduction ratio in accordance with the second predetermined schedule after said predetermined condition is satisfied when use of the second predetermined schedule is demanded.

According to a further aspect of the present invention, there is provided a control method for a continuously variable transmission for a motor vehicle including an engine, the continuously variable transmission being shiftable in reduction ratio in accordance with one of a plurality of predetermined schedules including a first predetermined schedule and a second predetermined schedule, the control method comprising the steps of; generating a first state indicative signal which assumes a first level thereof when use of the first predetermined schedule is demanded and a second level thereof when use of the second predetermined schedule is demanded; generating a time indicative signal indicative of time that has passed since the instant when said state indicative signal has been subject to a change from said first level thereof to said second level thereof, and controlling a reduction ratio of the continuously variable transmission in accordance with the first predetermined schedule when said state indicative signal assumes said first level thereof, determining a ramp connecting the first predetermined schedule to the second predetermined schedule as a predetermined function of said time indicative signal, varying the reduction ratio in accordance with said ramp until a predetermined condition is satisfied after said change has been made, and controlling the reduction ratio in accordance with the second predetermined schedule after said predetermined condition is satisfied when said second state indicative signal is generated.

BRIEF DESCRIPTION OF THE DRAWINGS

FIGS. 4A and 4B are flowcharts.

DETAILED DESCRIPTION OF THE INVENTION

Figure 1:
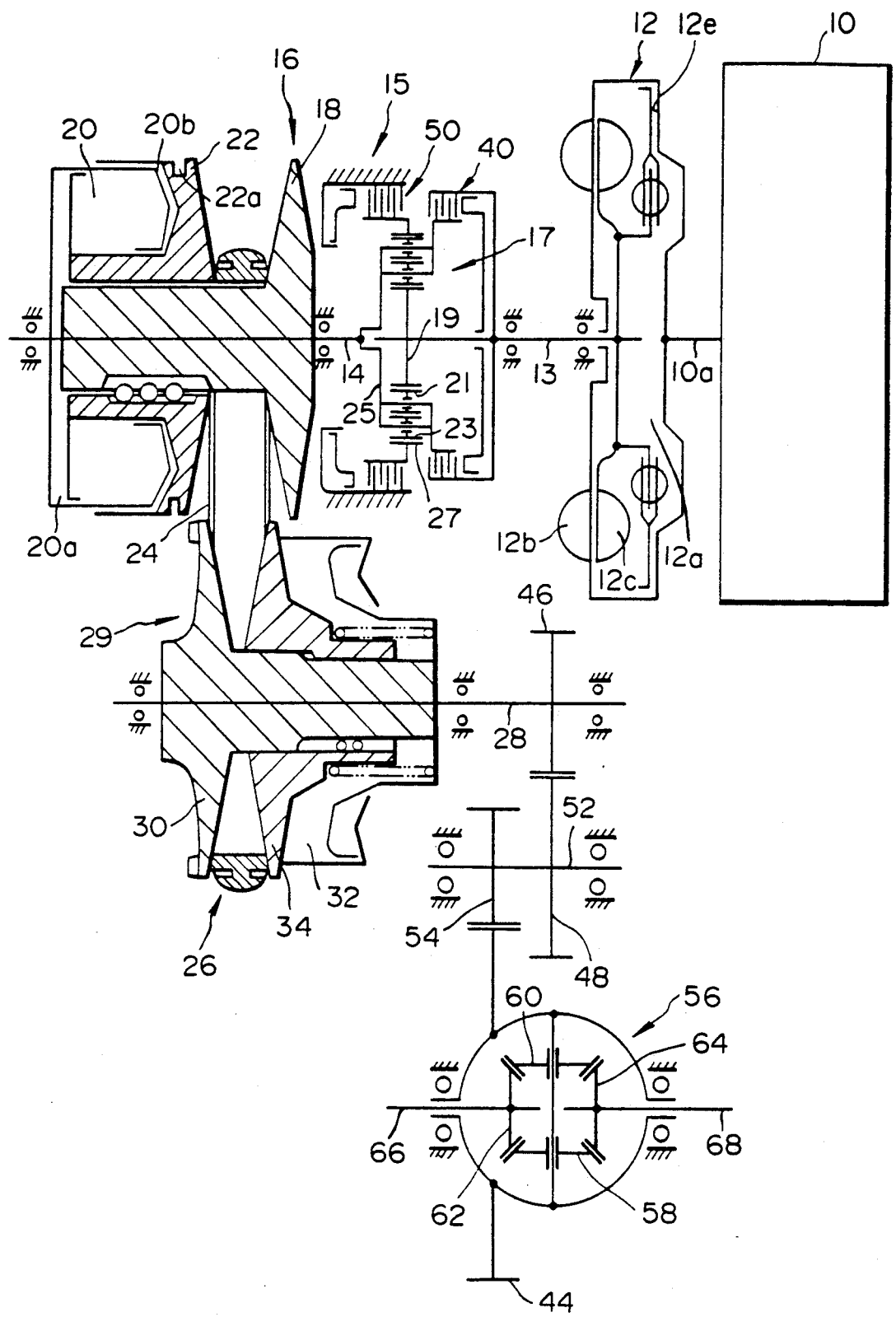
FIG. 1 is a schematic diagram of a power train of a motor vehicle showing a continuously variable transmission drivingly connected to an engine and a differential.

Referring to FIG. 1, a power train comprises an engine 10 with an output shaft 10a which is coupled with a hydrodynamic torque transmitting unit in the form of a fluid coupling 12. The fluid coupling 12 is of the lockup type and followed by a forward/reverse drive change-over mechanism 15 which is in turn followed by a driver pulley 16 of a continuously variable transmission 29. The driver pulley 16 is drivingly connected by a V-belt 24 to a follower pulley 26. The driver pulley 26 is drivingly connected to a differential 56 via a gear train including gears 46, 48, and 54. For detailed description of FIG. 1, reference should be made to U.S. Pat. No. 4,735,113 which has been hereby incorporated by reference.

Figure 2:
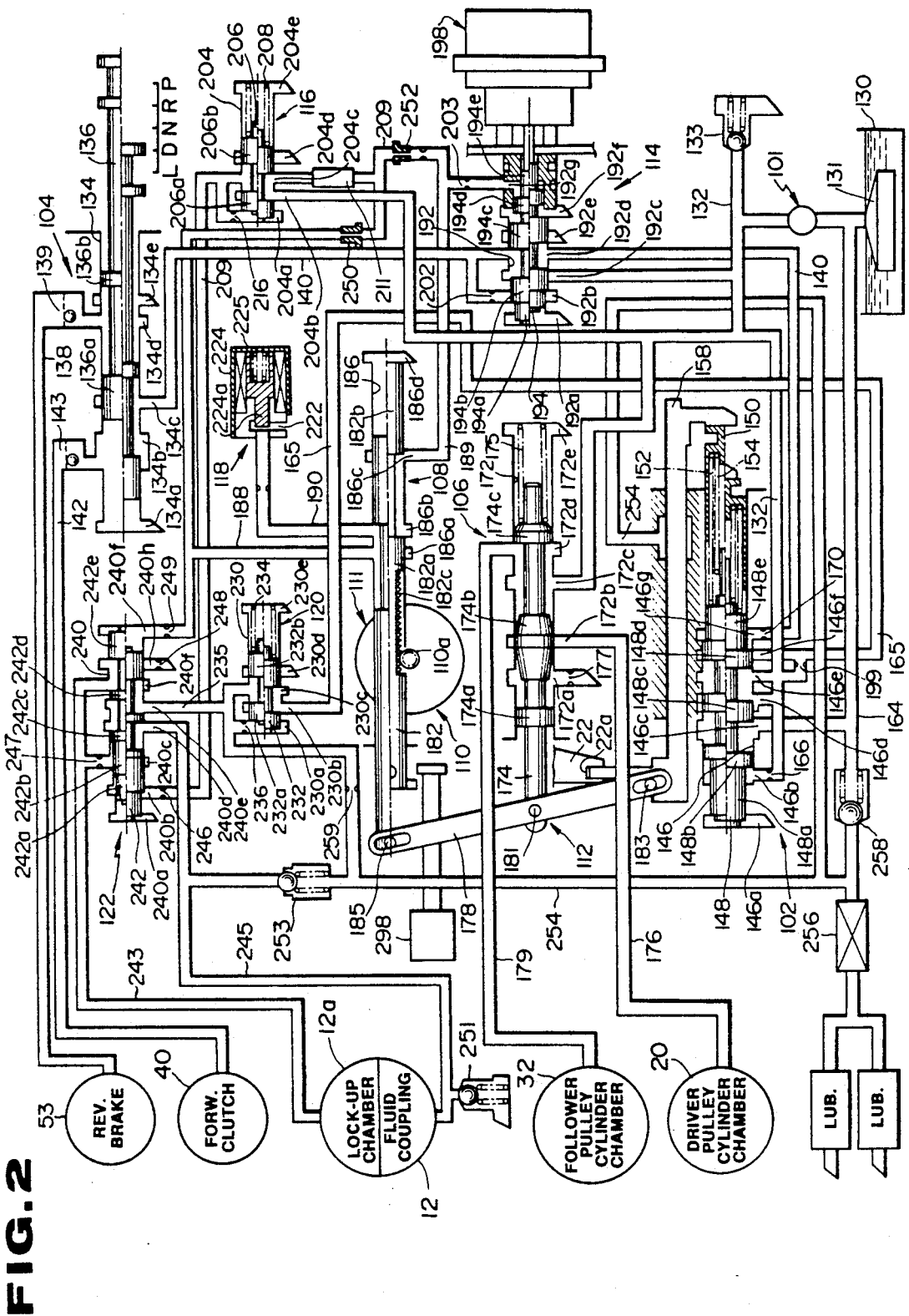
FIG. 2 is a hydraulic circuit diagram showing a hydraulic control system for the continuously variable transmission shown in FIG. 1.
Figure 3:
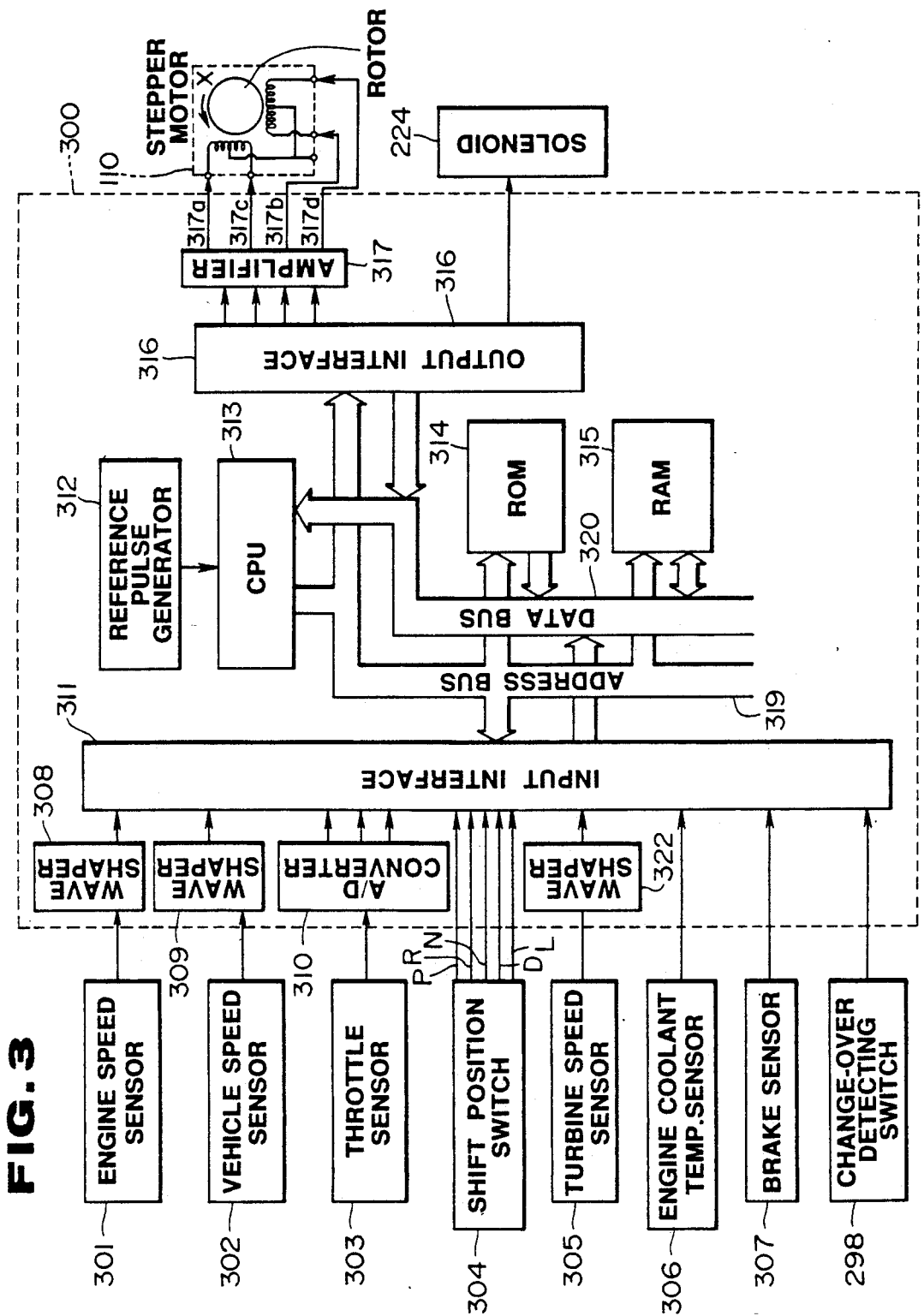
FIG. 3 is a block diagram showing a control unit for controlling a shift motor in the form of a stepper motor 110 and a solenoid 224 of an electromagnetic valve 118 shown in FIG. 2.

Referring to FIG. 2, a hydraulic control system comprises a shift motor in the form of a stepper motor 110 of a shift operation mechanism 112, and a solenoid 224 of an electromagnetic valve 118. The stepper motor 110 and the solenoid 224 are controlled by a control unit 300 as shown in FIG. 3. For detailed description of FIGS. 2 and 3, reference should be made to the above-mentioned U.S. Pat. No. 4,735,113 which has been hereby incorporated by reference.

Referring to FIGS. 4A and 4B, there is described a control apparatus or method according to the present invention. The continuously variable transmission which the present invention is applied to is shiftable in reduction ratio in accordance with a first predetermined schedule when an ordinary economy mode is selected, while it is shiftable in reduction ratio in accordance with a second predetermined schedule when a power mode is selected. Each of the first and second predetermined schedules is a retrievable data map containing target values in engine revolution speed versus varing sets of throttle opening degree and vehicle speed. The characteristic difference between these shift schedules is that, with the same throttle opening degree and vehicle speed, the second schedule used at the power mode gives a target engine revolution speed value higher than that given by the first schedule used at the ordinary economy mode. When the state of the continuously variable transmission shifts from the economy mode to the power mode, a change is made from demand for use of the first schedule to demand for use of the second schedule. This causes a step-like increase in target engine revolution speed at the instant when the change is made.

In FIG. 4A, at a step 702, it is determined whether the power mode is selected or not. When the power mode is selected, a state indicative signal assumes a digital one level, while when the power mode is not selected and thus the economy mode is selected, the state indicative signal assumes a digital zero level. In the case the economy mode is selected, the content of timer is cleared to zero at a step 704, and then the first schedule is retrieved using a set of current throttle opening degree and vehicle speed given to set a result as a target engine speed E at the economy mode, see step 706. In the case the power mode is selected, the second schedule is retreived to set a result as a target engine speed P at the power mode, see step 708. The content of the timer is incremented regularly by executing the flowchart shown in FIG. 4B. Since the content of the timer is cleared at the step 704, the content of the timer is indicative of time elapsed from the instant when a change, in demand, is made from the economy mode to the power mode.

After executing the step 706 or 708, a third schedule which connects the first schedule at the economy mode level with the second schedule at the power mode level is given as a predetermined function, see step 710. This function is expressed as:

$$A = E + T \times K_1 + K_2$$

where:
T: the content of timer;
$K_1$: constant;
$K_2$: constant.
E: target engine speed at economy mode After executing the step 710, the third schedule A is compared with the target engine speed P at a step 712. At this step 710, it is determined whether a predetermined condition is satisfied or not, that is, whether A is greater than and equal to P or not. When it is determined that A is greater than or equal to P, the content of P is set as a final target engine speed at a step 716, while when A is still less than P and thus the predetermined condition is not yet satisfied, the ramp A is set as the final target engine speed at a step 714. A closed loop control to bring an actual engine speed into agreement with the final target engine which is equal to A or P at block 718. The detailed description as to the closed loop control is omitted. For further understanding of the closed loop control to being the actual engine speed into agreement with the final target engine speed, reference should be made to U.S. Pat. No. 4,735,113, hereby incoporated by reference.

When a change from the ecomony mode to the power mode is made, the third schedule A which increases as the function of time T elapsed from the instant when the change is made, is used as the final target engine speed (see steps 710, 712 and 714), and the continuously variable transmission shifts down to bring the actual engine speed into agreement with this ramp A until the predetermined condition (A≧P) is satisfied. Thus, the actual engine speed gradually increases in accordance with the third schedule A to the second shift schedule at the power mode level. Because of this controlled gradual increase in engine speed during transistion from the economy mode level to the power mode level, the temporary torque interruption has been avoided and an improved ride feel for acceleration is given.

In the preceding example, the engine speed is used as the predetermined control variable. A driver pulley revolution speed (=turbine revolution speed) may also be used as the predetermined control variable.

What is claimed is:

1. A control apparatus for a continuously variable transmission for a motor vehicle including an engine, the continuously variable transmission being shiftable in reduction ratio in accordance with one of a plurality of predetermined schedules including a first predetermined schedule and a second predetermined schedule, the control apparatus comprising:

means for controlling a reduction ratio of the continuously variable transmission in accordance with the first predetermined schedule when use of the first predetermined schedule is demanded;

said controlling means being operative to control the reduction ratio in accordance with a predetermined function of time that has passed since the instant when a change has been made from a demand for use of the first predetermined schedule to a demand for use of the second predetermined schedule until a predetermined condition is satisfied;

said controlling means being operative to control the reduction ratio in accordance with the second predetermined schedule after said predetermined condition is satisfied when use of the second predetermined schedule is demanded.

2. A control apparatus for a continuously variable transmission for a motor vehicle including an engine, the continuously variable transmission being shiftable in reduction ratio in accordance with one of a plurality of predetermined schedules including a first predetermined schedule and a second predetermined schedule, the control apparatus comprising:

means for generating a state indicative signal which assumes a first level when use of the first predetermined schedule is demanded and a second level when use of the second predetermined schedule is demanded;

means for generating a time indicative signal indicative of time that has passed since the instant when said state indicative signal has been subject to a change from said first level thereof to said second level thereof; and means for controlling a reduction ratio of the continuously variable transmission in accordance with the first predetermined schedule when said state indicative signal assumes said first level thereof;

said controlling means being operative to determine a third schedule connecting the first predetermined schedule to the second predetermined schedule as a predetermined function of said time indicative signal and vary the reduction ratio in accordance with said third schedule until a predetermined condition is satisfied after said change has been made;

said controlling means being operative to control the reduction ratio in accordance with the second predetermined schedule after said predetermined condition is satisfied when said state indicative signal assumes said second level thereof.

3. A control apparatus as claimed in claim 2, wherein said pedetermined function involves, a target value of a predetermined control variable which is given in accordance with the first predetermined schedule upon making said change.

4. A control apparatus as claimed in claim 3, wherein said predetermined condition is satisfied when a target value of said predetermined control variable given by said third schedule becomes substantially equal to a target value of said predetermined control variable given in accordance with the second predetermined schedule.

5. A control apparatus as claimed in claim 4, wherein said predetermined control variable is an engine revolution speed of the engine.

6. A control apparatus as claimed in claim 4, wherein said predetermined control variable is a driver pulley revolution speed of a driver pulley of the continuously variable transmission.

7. A control method for a continuously variable transmission for a motor vehicle including an engine, the continuously variable transmission being shiftable in reduction ratio in accordance with one of a plurality of predetermined schedules including a first predetermined schedule and a second predetermined schedule, the control method comprising the steps of:

controlling a reduction ratio of the continuously variable transmission in accordance with the first predetermined schedule when use of the first predetermined schedule is demanded;

controlling the reduction ratio in accordance with a predetermined function of time that has passed since the instant when a change is made from a demand for use of the first schedule to a demand for use of the second predetermined schedule until a predetermined condition is satisfied; and controlling the reduction ratio in accordance with the second predetermined schedule after said predetermined condition is satisfied when use of the second predetermined schedule is demanded.

8. A control method for a continuously variable transmission for a motor vehicle including an engine, the continuously variable transmission being shiftable in reduction ratio in accordance with one of a plurality of predetermined schedules including a first predetermined schedule and a second predetermined schedule, the control method comprising the steps of:

generating a first state indicative signal which assumes a first level thereof when use of the first predetermined schedule is demanded and a second level thereof when use of the second predetermined schedule is demanded;

generating a time indicative signal indicative of time that has passed since the instant when said state indicative signal has been subject to a change from said first level thereof to said second level thereof; and controlling a reduction ratio of the continuously variable transmission in accordance with the first predetermined schedule when said state indicative signal assumes said first level thereof;

determining a third schedule connecting the first predetermined schedule to the second predetermined schedule as a predetermined function of said time indicative signal;

controlling the reduction ratio in accordance with said third schedule until a predetermined condition is satisfied after said change has been made; and controlling the reduction ratio in accordance with the second predetermned schedule after said predetermined condition is satisfied when said second state indicative signal is generated.

9. A control method as claimed in claim 8, wherein said predetermined function involves a target value of a predetermined control variable which is given in accordance with the first predetermined schedule upon making said change.

10. A control method as claimed in claim 9, wherein said predetermined condition is satisfied when a target value of said predetermined control variable given by said third schedule becomes substantially equal to a target value of said predetermined control variable given in accordance with the second predetermined schedule.

* * * * *